Figures 1, 2:
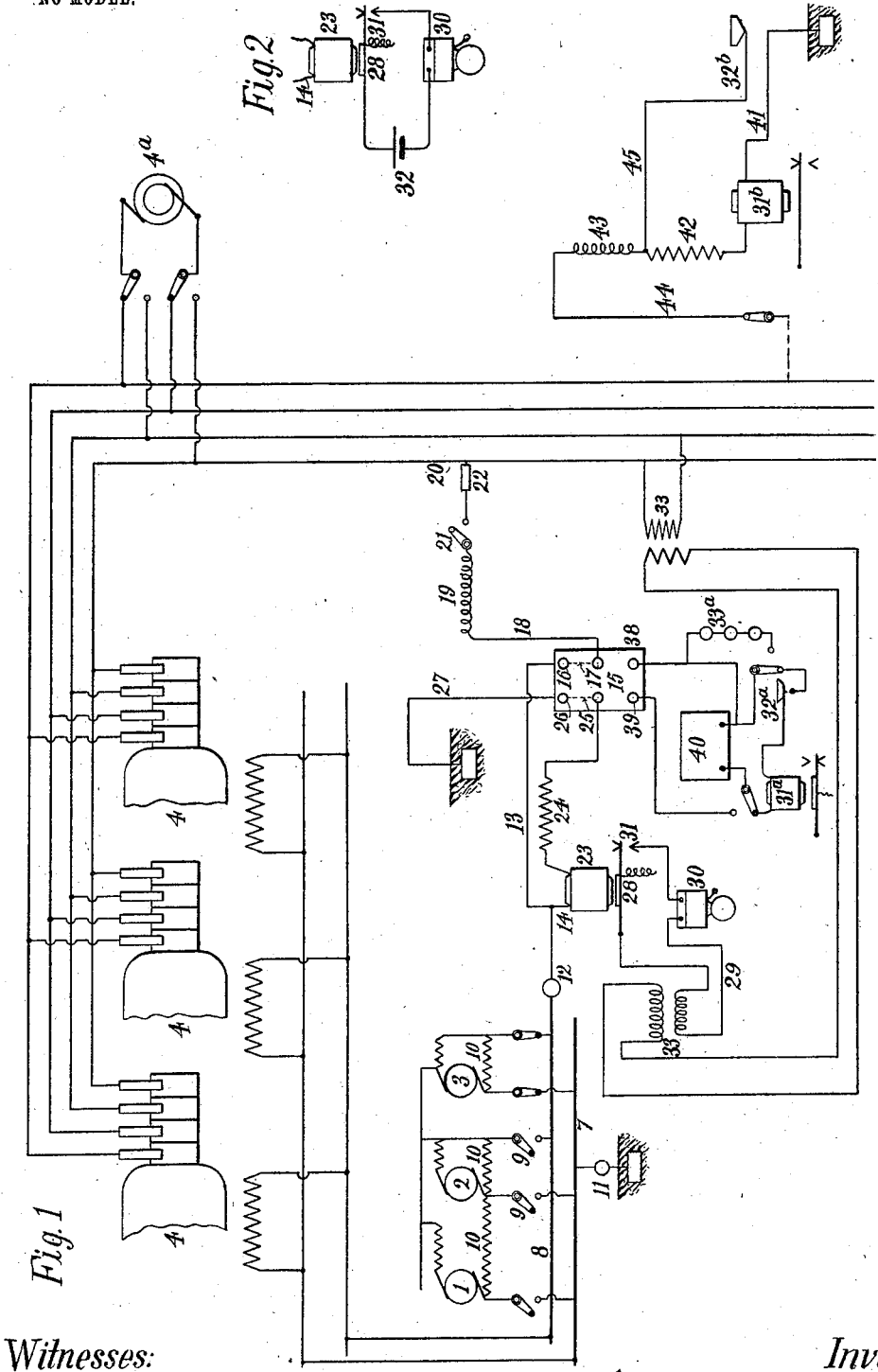

No. 727,865. PATENTED MAY 12, 1903.
T. W. VARLEY.
GROUND DETECTOR FOR ELECTRIC CIRCUITS.
APPLICATION FILED DEC. 7, 1901.
NO MODEL.

Witnesses:

Inventor
Thomas W. Varley
by ———— Atty

No. 727,865. Patented May 12, 1903.

UNITED STATES PATENT OFFICE.

THOMAS W. VARLEY, OF NEW YORK, N. Y.

GROUND-DETECTOR FOR ELECTRIC CIRCUITS.

SPECIFICATION forming part of Letters Patent No. 727,865, dated May 12, 1903.

Application filed December 7, 1901. Serial No. 84,999. (No model.)

*To all whom it may concern:*

Be it known that I, THOMAS W. VARLEY, a citizen of the United States, and a resident of New York, in the county of New York and State of New York, have invented certain new and useful Improvements in Ground-Detectors for Electric Circuits, of which the following is a specification.

My invention relates to the class of apparatus employed for testing the electrical condition of systems of circuits for electrical distribution.

The object of the invention is to provide convenient, reliable, and effective means for determining whether the insulation of any portion of the system has fallen below a predetermined standard, and, if so, for locating such faulty portion and also for affording a convenient method of intercommunication between different portions of the circuit and the central station.

The general plan of the invention may be described as follows: At the central station a source of current—for example, the exciters of alternating-current generators—have their respective poles connected with the bus-bars in the usual manner. One bus-bar—say the positive—is connected with the earth through a high resistance—such, for instance, as a bank of incandescent electric lamps. The negative bus-bar is connected through a resistance—such, for instance, as one or more incandescent electric lamps—with two branch circuits, one leading through a protective resistance to one branch of the main bus-bars or to the distributing-circuit and the other through a circuit-controlling magnet and a suitable resistance to the earth. A suitable signaling device is included in the circuit controlled by the magnet, so that a signal will be given when its armature falls away from the magnet. It will be seen, therefore, that normally both sides of the source are grounded through the lamps, and the current traversing the magnet will hold its armature forward. If, however, a ground occurs upon the main circuit with which the branch around the magnet is connected, the magnet will be to a certain extent shunted and its armature will be released, causing the signal to be given. This signal calls attention to the existence of the fault or ground, and it then becomes necessary to locate it. For this purpose certain additional apparatus is provided, whereby an operator by properly manipulating the circuit connections upon different portions of the system may cause an indication to be made at the central station, showing when the faulty portion of the circuit is being manipulated.

The invention also involves certain other features, which will be described more in detail in connection with the accompanying drawings, of which—

Figure 1 is a diagram indicating a general organization of apparatus for carrying out the invention, and Fig. 2 illustrates a modification.

Referring to the drawings, 1 2 3 represent three direct-current generators, although one alone might be used. These are here shown as being the exciters for alternating-current generators 4 4 4, although the invention may be employed with a direct-current system. The generators 1, 2, and 3 have their positive poles connected with a bus-bar 7 and their negative poles with a corresponding bar 8. Suitable switches 9 may be employed for controlling these connections. The usual equalizing-conductor 10 is shown as applied to the generators 1, 2, and 3. The bus-bar 7 is connected with the earth through a resistance 11, which may consist of one or more incandescent electric lamps. This resistance is sufficiently great to prevent the flow of any considerable current therethrough. The negative bus-bar 8 is connected, through a similar resistance 12, with two conductors 13 and 14. The conductor 13 leads to a contact 16 of a double-throw switch 15. The corresponding contact-arm 17 is connected by a conductor 18, through an inductive resistance 19, with one of the conductors 20 of the main supply-circuit of the system. A switch 21 and a safety-fuse 22 are included in the conductor 18. The conductor 14 is connected, through the coils of a magnet 23 and a suitable reistance 24, with the other contact-arm 25 of the switch, and the contact 26 is connected with the earth by a conductor 27.

There will always be more or less leakage upon the circuit of a large system of distribution; but, having determined the degree of insulation for the system as a whole which is normally to be permitted, then the switch 21 is opened and a temporary connection made therefrom to ground through a supplemental resistance corresponding to the desired insulation of the circuit. The armature 28 of the magnet is then adjusted to fall back when that resistance is decreased, but otherwise to be held toward the magnet. A local circuit 29, including a signaling device—such, for instance, as an alarm-bell 30—has its respective terminals connected with the armature 28 and back contact 31. This local circuit may be supplied with current from a battery 32, as indicated in Fig. 2, or from some other source—such, for instance, as a converter 33, receiving its current from the main source, as in Fig. 1.

If now the switches 9 and 21 be closed and the switch-arms 17 and 25 closed with the contacts 16 and 26, respectively, then if the insulation of the system is not defective the magnet 23 will hold its armature 28 away from the back contact. If, however, the insulation of the main circuit falls below the required predetermined standard, the current flowing through the branch 13 18 will increase, thus in a measure shunting the magnet 23. The increased quantity of current thus flowing through the lamp 12 will increase the drop of potential, and thus a less difference of potential will be applied to the magnet 23. The decrease of current through this magnet will permit the armature 28 to fall back, and thus the alarm will be given by the bell 30. The existence of the fault having thus been indicated, the locating of it is necessary. This is accomplished in the following manner: First, the different circuits are connected, one at a time, with a spare or independent generator 4ª until the circuit upon which the fault exists is determined by means of the devices described. The individual primary circuits of the respective customers upon that circuit are then tested. An operator is sent out to the respective customers' circuits with a suitable device for forming an artificial ground—such, for instance, as a bank of lamps. By arranging to connect the customer's primary circuits with earth through this bank of lamps a predetermined number of times or at predetermined intervals a signal will be given at the central station by the action of the armature 28, the magnet 23 being so adjusted that it will hold the armature forward until such additional ground is added. Then the operator opens and closes the primary switch and then repeats the special signal and passes on to the next customer, repeating the operation and keeping note of the time at which he opens the several primary switches. Meanwhile at the central station the attendant upon receiving the first signal throws the switch 15, so as to connect the arms 25 and 17 with the contacts 38 and 39, respectively, and thus cut into circuit a voltmeter 40. By watching this, if the opening of the primary switch cuts off the fault, then the voltmeter-indicator will move back toward zero, but otherwise will not be materially affected. When the second signal is sent in by the operator after closing the primary switch, then the needle will move forward. The switch 15 is then returned to its former position until the next signal is sent in and the operation is repeated. The attendant also keeps note of the time at the central station, and thereby is enabled by checking up his records with those of the operator at convenient times to thus locate the particular primary switch beyond which the fault occurred.

If the fault should prove to be in the primary cable, then different portions of it are sectioned and the test made in like manner.

There are occasions when it is desirable that the operator outside should be able to communicate information to the central station, and vice versa. For this purpose the operator is provided with a set of apparatus similar to that at the central station, and after sending in his preliminary signal, as indicated at 31$^b$ and 32$^b$, any desired signals corresponding to a prearranged code may be sent in. The sounder 31$^b$ is shown as being connected in a circuit 41, capable of being grounded, and a suitable resistance 42 may also be included in series therewith. An inductive resistance 43 is also connected in this circuit, leading to a conductor 44, adapted to be connected with any portion of the outside circuit. A conductor 45 leads from one end of the inductive resistance to the key 32$^b$, adapted to shunt the resistance 42 and magnet 31$^b$, leaving the inductive resistance 43 in circuit. The station is provided with a magnet or telegraph sounder 31$^a$ and key 32$^a$, which may be connected in series with a bank of lamps 33$^a$. This provides a convenient means for both sending and receiving signals.

At the central station the sounder 31$^a$ and key 32$^a$ are shown as being capable of connection with the switch 15 and may be substituted for the voltmeter and used for sending and receiving signals.

In case it is desired that the circuit should be made "dead"—that is to say, disconnected from the source of current for repairs or other purpose—the operator can thus signal to the central station and can learn when it is dead. In some instances it may be desired to render dead only a portion of the circuit by opening a switch intermediate between that portion and the central station. In such case a supplementary device may be connected at the central station in parallel with that already described.

It should be noted that the inductive resistance 19 will serve to prevent any undue flow of current from the main circuit through the conductor 18, and thus through it work through the conductor 27 or by way of the exciters. It will also be understood that some other source of electric current than the exciters of the machines may be employed, if desired.

I claim as my invention—

1. The combination with a supply-circuit of an electric distribution system and the generators therefor, of exciters for the generators, means for deriving a local high-resistance ground-circuit from the exciters, a shunt-circuit around said high-resistance ground-circuit, and a means for connecting the same with the supply-circuit, and an indicating or signaling device in said high-resistance grounded circuit responsive to a predetermined shunting effect of the shunt-circuit.

2. The combination with a supply-circuit of an electric distribution system and the generators therefor, of exciters for the generators, means for deriving a local high-resistance ground-circuit from the exciters, a shunt-circuit around said high-resistance ground-circuit, and a means for connecting the same with the supply-circuit, an indicating or signaling device in said high-resistance grounded circuit responsive to a predetermined shunting effect of the shunt-circuit, and means for removing the grounded circuit and substituting therefor a local signaling-circuit.

3. The combination with the supply-circuit, of an electrical distribution system, of means for deriving a local high-resistance grounded circuit, means for indicating the flow of current from any grounded portion of the system through said high-resistance grounded circuit, and means for transmitting and receiving signals through the circuit thus established.

4. The combination with a system of electrical distribution, its generators, and the exciters therefor, of a ground-detecting apparatus consisting of a divided circuit, one branch being connected with the earth through a suitable resistance, and means for connecting the other branch with the supply-circuit, means for indicating the presence of an excessive current in the last-named circuit, and means for independently transmitting current over the several sections of the main distributing system for the purpose of determining in which section an indicated ground is present.

5. The combination with a system of alternating-current electric distribution, of a signaling and receiving device at the central station, a locally-grounded circuit connected therethrough with the main circuit, and means for connecting between various portions of the main circuit and the ground, a local receiving and signaling circuit, substantially as and for the purpose described.

6. The combination with an alternating-current system of distribution, a ground-detecting apparatus consisting of circuit connections with the earth from one side of the exciter of the main generator, a high-resistance circuit leading therefrom to two branch circuits, one containing an indicating or signaling device and means for connecting the same with the earth, an inductive resistance in the other branch circuit, and means for connecting the said branch circuit with the main distributing system.

7. The combination with an alternating-current system of distribution, a ground-detecting apparatus consisting of circuit connections with the earth from one side of the exciter of the main generator, a high-resistance circuit leading therefrom to two branch circuits, one containing an indicating or signaling device and means for connecting the same with the earth, an inductive resistance in the other branch circuit, means for connecting the said branch circuit with the main distributing system, and means for substituting for the ground connections of the first-named branch circuit, a local circuit and an indicating device connected in said local circuit.

8. The combination with an alternating-current system of electrical distribution, of a source of continuous current, means for connecting one side of said source with earth, two branch circuits with which the other side is connected, an inductive resistance connected in one of said branch circuits, and connections therethrough with the main circuit, a ground circuit with which the other side of the branch circuit is connected, an electromagnet connected in the last-named branch circuit, a local indicating circuit operated by the armature of the last-named branch circuit and responsive to a predetermined diminution of current therethrough, substantially as and for the purpose described.

Signed at New York, in the county of New York and State of New York, this 21st day of November, A. D. 1901.

THOMAS W. VARLEY.

Witnesses:
WM. H. CAPEL,
CHARLES A. TERRY.